(12) United States Patent
DeVane

(10) Patent No.: US 7,523,443 B2
(45) Date of Patent: Apr. 21, 2009

(54) PROGRAMMING LANGUAGE TYPE SYSTEM WITH AUTOMATIC CONVERSIONS

(75) Inventor: Charles J. DeVane, Upton, MA (US)

(73) Assignee: The MathWorks, Inc., Natick, MA (US)

( * ) Notice: Subject to any disclaimer, the term of this patent is extended or adjusted under 35 U.S.C. 154(b) by 842 days.

(21) Appl. No.: 10/414,250

(22) Filed: Apr. 15, 2003

(65) Prior Publication Data

US 2004/0210869 A1    Oct. 21, 2004

(51) Int. Cl.
*G06F 9/44*    (2006.01)
*G06F 9/45*    (2006.01)

(52) U.S. Cl. .................................. 717/117; 717/137

(58) Field of Classification Search .......... 717/136–151
See application file for complete search history.

(56) References Cited

U.S. PATENT DOCUMENTS 4,805,128 A * 2/1989 Nelsen et al. ............... 708/204
5,317,526 A * 5/1994 Urano et al. ................ 708/204
5,745,125 A * 4/1998 Deering et al. .............. 345/503

OTHER PUBLICATIONS

A Floating-Point to Fixed-Point Assembly Program Translator for the TMS 320C25, Seehyun Kim, IEEE copyright 1994.*

* cited by examiner

*Primary Examiner*—Chuck O Kendall
(74) *Attorney, Agent, or Firm*—Lahive & Cockfield, LLP; Kevin J. Canning

(57) ABSTRACT

A programming language type system includes, in a memory, a set of numeric type including integer types, fixed-point types and floating-point types, a set of type propagation rules to automatically determine result types of any combination of integer types, fixed-point types and floating-point types, constant annotations to explicitly specify a result type of a literal constant, context-sensitive constants whose type is determined from a context of a constant according to the set of type propagation rules, an assignment operator to explicitly specify a type of a value or computation, and operator annotations to explicitly specify a result type of a computation.

16 Claims, 2 Drawing Sheets

Programming Language
22

Propagation Rules
40

Numeric Types
42

Context-sensitive Constants
44

Constant Annotations
46

Special Assignment Operator
48

Operator Annotations
50

*Fig. 2*

PROGRAMMING LANGUAGE TYPE SYSTEM WITH AUTOMATIC CONVERSIONS

TECHNICAL FIELD

This invention relates to type system with automatic conversions.

BACKGROUND

In ordinary programming languages, every variable and constant has a type. A type is a set of values together with a set of operations that can be performed on those values. For example, integer types represent a specific range of integer values. Floating-point types represent real numbers in a format similar to scientific notation. The representation includes two numbers: a significand (i.e., a mantissa, or fraction) and the exponent. The significand holds the significant bits of the number, and the exponent encodes the location of the radix point.

Some computer applications, such as real-time control systems, perform real number computations but cannot afford the computing cost of floating-point arithmetic. These applications commonly use fixed-point types, which represent real numbers using integers. Arithmetic operations such as addition and multiplication are performed exactly the same for both integer and fixed-point types, so operations are much cheaper than floating-point arithmetic.

Like floating-point types, fixed-point types also represent real numbers in a format similar to scientific notation. Fixed-point types use a stored integer (comparable to the significand) and a radix point (the negative of the exponent). However, unlike floating-point types, the radix point is encoded into the type and not stored as part of the value. The radix point cannot change, hence the name "fixed-point".

Ordinary programming languages provide not only a set of types, but also a set of rules governing how these types can be combined in expressions. We call these rules type propagation rules. Type propagation rules typically specify, for each operator of the language, what combinations of input types are permissible, and what type the result will have. Without type propagation rules, the programmer must explicitly specify the type of each operation (as in assembly language). The type propagation rules together with the set of types supported by a language are collectively called a type system.

SUMMARY

In an aspect, the invention features a programming language type system including in a memory, a set of numeric types including integer types, fixed-point types and floating-point types, a set of type propagation rules to automatically determine result types of any combination of integer types, fixed-point types and floating-point types, and constant annotations to explicitly specify a type of a literal constant.

In another aspect, the invention features a programming language type system including in a memory, a set of numeric types including integer types, fixed-point types and floating-point types, a set of type propagation rules to automatically determine result types of any combination of integer types, fixed-point types and floating-point types, and an assignment operator to explicitly specify a type of a value or computation.

In another aspect, the invention features a programming language type system including in a memory, a set of numeric types including integer types, fixed-point types and floating-point types, a set of type propagation rules to automatically determine result types of any combination of integer types, fixed-point types and floating-point types, and operator annotations to explicitly specify a result type of a computation.

In another aspect, the invention features a programming language type system including in a memory, a set of numeric types including integer types, fixed-point types and floating-point types, a set of type propagation rules to automatically determine result types of any combination of integer types, fixed-point types and floating-point types, and context-sensitive constants whose type is determined from a context of a constant according to the set of type propagation rules.

In another aspect, the invention features a programming language type system including in a memory, a set of numeric types including integer types, fixed-point types and floating point types, and a set of type propagation rules to automatically determine result types of any combination of the numeric types in which the set of type propagation rules include rules that permit automatic implicit conversions between the numeric types.

One or more of the following features can also be included. The rules can implicitly convert fixed-point types to floating-point types when a fixed-point type and a floating-point type are combined. The rules can implicitly convert integer types to a fixed-point equivalent type. The fixed-point equivalent type can include a fixed-point type whose stored integer type is the integer type with a radix point of zero. The rules can include producing a signed integer when combining two signed integers. The rules can include producing an unsigned integer when combining two unsigned integers. The rules can include producing a fixed-point type with a radix point shifted when combining a signed integer and an unsigned integer. The rules can include determining a type of a context-sensitive constant by an operator applied to it and by the operator's operands. The type can be single if the operand is single and double if the operand is double. The type can depend on the operator if the operand is fixed-point. The assignment operator can be in the form of c=a op b, where op inherits its result type from c.

In another aspect, the invention features a programming language type system including fixed-point rules in which fixed-point types can be automatically converted to floating-point types, and integer rules in which integer types are distinct from fixed-point types and integer types can be automatically converted to fixed-point types.

One or more of the following features can also be included. The fixed-point rules can preserve integer-ness for all integer operations. The fixed-point rules can preserve integer-ness for some integer operations. The fixed-point rules can preserve integer-ness for no integer operations. The fixed-point rules can preserve integer-ness for multiplication and division integer operations via a graduated radix point rule. The fixed-point rules for multiplication and division integer operations can use a graduated radix point rule. The fixed-point rules can preserve integer-ness for some integer operations via operator annotations. The fixed-point rules can preserve integer-ness for some integer operations via an inherited type rule. Output types of any operation can be specified in a top-down manner using a special assignment operator.

In embodiments, the system can include constant annotations to explicitly specify the types of literal constants. The rules can distinguish context-sensitive constants from ordinary constants lexically. The system can include context-sensitive constants whose type is determined automatically from the constant's context by type propagation rules.

In still another aspect, the invention features a programming language type system including fixed-point rules in which fixed-point types can be automatically converted to floating-point types, and integer rules in which integer types are a subset of the fixed point types.

One or more of the following features can also be included. The fixed-point rules can preserve integer-ness for all integer operations. The fixed-point rules can preserve integer-ness for some integer operations. The fixed-point rules can preserve integer-ness for no integer operations. The fixed-point rules can preserve integer-ness for multiplication and division integer operations via a graduated radix point rule. The fixed-point rules for multiplication and division integer operations can use a graduated radix point rule. The fixed-point rules can preserve integer-ness for some integer operations via operator annotations. The fixed-point rules can preserve integer-ness for some integer operations via an inherited type rule.

Further aspects, features, and advantages will become apparent from the following.

DESCRIPTION OF DRAWINGS

FIG. 2 is a block diagram of the programming language of FIG. 1.

DETAILED DESCRIPTION

Figure 1:
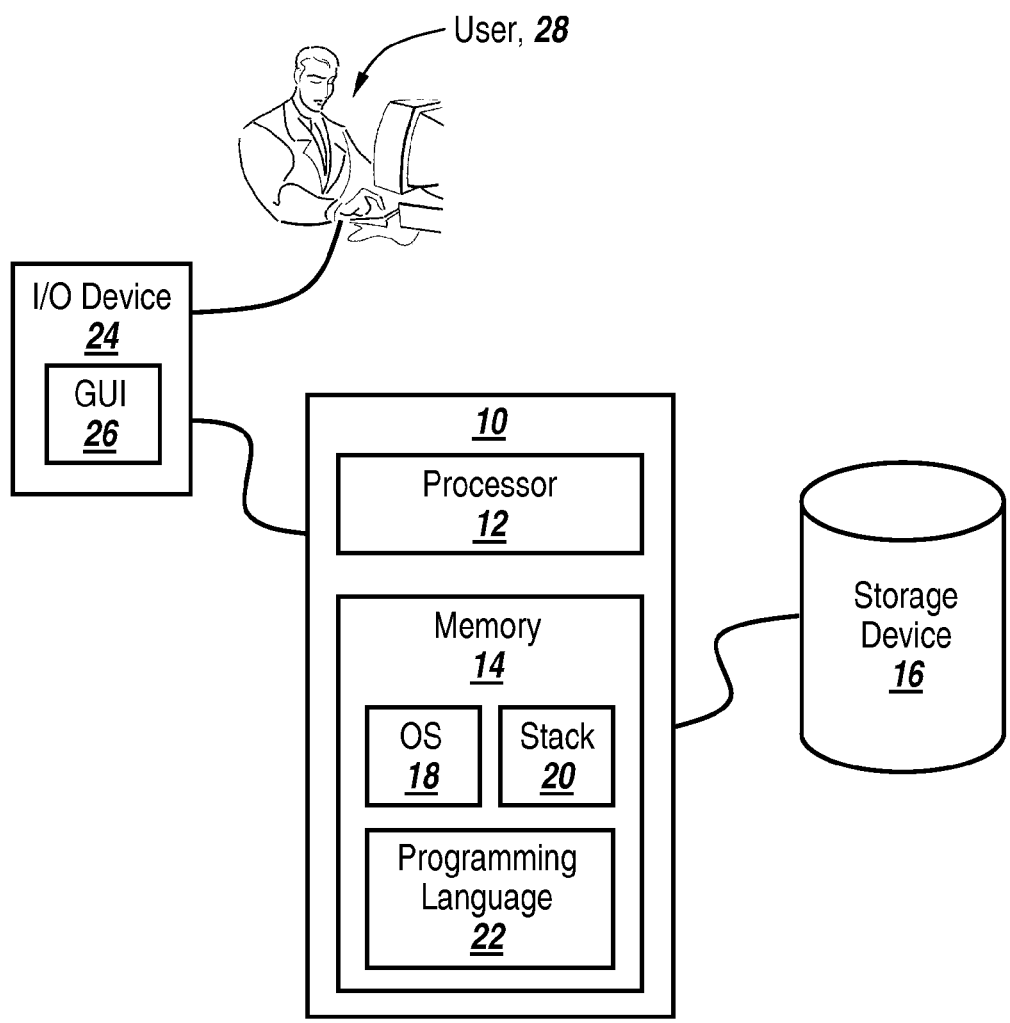
FIG. 1 is a block diagram of a system.

In FIG. 1, a system 10 includes processor 12, memory 14 and storage device 16. Memory 14 includes an operating system (OS) 18, such as Linux, UNIX or Microsoft Windows XP, a TCP/IP stack 20 for communicating with a network (not shown), and a programming language 22. System 10 also includes a link to an input/output (I/O) device 24 for display of a graphical user interface (GUI) 26 to a user 28.

In FIG. 2, the programming language 22 includes type programming rules 40. In general, type propagation rules operate in a bottom-up manner, where the type of a computation is determined solely by the types of its operands. The C programming language propagation rules are one example. This simple technique works well unless the user 28 needs to explicitly specify the type of an operation. The user 28 does this indirectly by casting one of the inputs, which is counter-intuitive. Sometimes it is more helpful to the user 28 if the type of a value or computation can be determined from the context in which it appears in a top-down manner.

A good type system balances two opposing goals of making it hard to program incorrect computations, while making it easy to specify complex computations correctly. An important aspect of this is how the type system supports mixing types, e.g., adding an integer to a floating-point number. Strongly typed languages discourage mixing types, generally forcing the user to insert explicit conversions. The intent is to protect the user 28 from accidental errors. Weakly typed languages encourage mixing types by inserting implicit conversions for the user 28. The intent here is to assist the user 28, who presumably knows what she is doing and doesn't require protection. In practice, maximizing user 28 productivity requires a balance between the two.

The following terms are used in this detailed description. "s8" refers to signed 8-bit integers and "u8" refers to unsigned 8-bit integers. "s16" refers to 16-bit integers and "u16" refers to unsigned 16-bit integers. "s32" refers to signed 32-bit integers and "u32" refers to unsigned 32-bit integers. "single" refers to single precision floating-point and "double" refers to double precision floating-point. "sn.r" refers to wigned fixed-point numbers, where sn is the stored integer type and r is the location of the radix point. For example, s16.4 is a fixed point type using an s16 stored integer with four fraction bits right of the radix point. Similarly, un.r refers to a signal fixed-point numbers. "$r_a$" refers to the radix point of operand a.

Adding two n-bit signed numbers, or two n-bit unsigned numbers, can produce an n+1-bit result. For example, $s8+s8=s9$ $u8+u8=u9$ However, adding an n-bit signed number to an n-bit unsigned number can produce an n+2-bit result. For example, $s8+u8=s10$ Thus adding mixed signed and unsigned integer types requires a greater range, and has a greater risk of overflow, than adding types of like signed-ness.

Multiplying two n-bit numbers (any combination of signed or unsigned) can produce a 2n-bit result. Since one cannot usually increase word size without bound, multiplying several numbers together becomes problematic. At some point one is forced to throw away part of the product. There is no single "right" answer about which bits to throw away. For example, if one is doing "nearly integer" arithmetic (with radix points generally close to 0) one may want to keep the low order bits, choosing the radix point as $r_a+r_b$:

$s16.4=s16.2*s16.2$

On the other hand, if one is doing "fractional" arithmetic (with radix points generally close to n) one may want to keep the high order bits, choosing the radix point as $r_a+r_b-n$:

$s16.12=s16.14*s16.14$

If one needs a more adaptive approach one can extract middle portions of the product using a graduated radix point as $(r_a+r_b)/2$:

$s16.7=s16.10*s16.4$

This variety of approaches suggests that in practice, regardless of the default rules, users should be able to explicitly specify which part of a product they want to keep. Division has similar issues.

Specifying the data type of a fixed-point literal constant can be problematic. There are well established lexical norms for writing integer and floating-point constants: 3.1415 and 17E-3 are floating-point constants because they contain a decimal point or an exponent; 3 is an integer constant because it contains neither. The C programming language only has two floating-point types, so it can readily distinguish a double constant from a float constant by appending an F to the latter. Fixed-point literal constants represent real quantities, so they must be free to use decimal points and exponents. There are (theoretically) infinitely many fixed-point types so a trivial suffix will not suffice.

Programming fixed-point computations requires a lot of "bookkeeping": keeping track of scaling factors at each step of the computation, and inserting the correct scaling instructions. Doing this bookkeeping by hand is difficult, time consuming, monotonous, and error prone. A compiler can perform this bookkeeping automatically if one introduces fixed-point types to the programming language. For this to be effective, the user must be able to write complicated expressions in a simple, compact form, and the compiler should be able to automatically determine the correct types of constant values and intermediate computations. For those cases when the compiler's choice of type is not what the user wants, the user should be able to specify explicitly and compactly the type for a constant value or computation. Furthermore, the fixed-point types should integrate smoothly with the other numeric types in the language.

The programming language 22 includes a set of numeric types 42 including integer, fixed-point, and floating-point types, the set of type propagation rules 40 to automatically determine the types of constant values and computations in a manner that smoothly integrates all the numeric types, context-sensitive constants 44, whose type is determined automatically from the constant's context by the type propagation rules, constant annotations 46 to explicitly specify the type of a literal constant, a special assignment operator 48 to explicitly specify the type of a value or computation, and operator annotations 50 to explicitly specify the result type of a computation.

The set of numeric types 42 include three kinds of numeric types, i.e., integer, fixed-point, and floating-point. Integer types include signed and unsigned integers, in any bit width. The most common bit widths are powers of two (e.g., 8, 16, 32, 64), but any width greater than 0 is included. Fixed-point types include both radix-point-only scaling and the more general slope-bias scaling. Integer types can be viewed as completely distinct from fixed-point types (e.g., s16 is distinct from s16.0), or integers can be viewed as a subset of fixed-point types (e.g., s16 is merely a shorthand for s16.0). Floating-point types include any width of mantissa and exponent. The most common are single- and double-precision types conforming to IEEE 754 standard.

The set of type propagation rules 40 determine a result type for any combination of integers, fixed-point, or floating-point types. In particular, the rules set 40 includes rules that permit automatic implicit conversions between integer, fixed-point, and floating-point types. In an example, rules set 40 implicitly converts fixed-point types to floating-point types when the two types are combined.

In another example, the rules set 40 treats integers as distinct types from fixed-point types. The propagation rules 40 for combining two integers are separate from the rules 40 for combining two fixed-point types. The integer rules always produce an integer type, and the fixed-point rules always produce a fixed-point type. When an integer type and a fixed-point type are combined the integer type is implicitly converted to its fixed-point equivalent (i.e., the fixed-point type whose stored integer type is the original integer type and whose radix point is 0). For example, s16 would be converted to s16.0. Then the fixed-point propagation rules are applied.

In another example, integers are a subset of fixed-point types. In this example there is no question of implicitly converting integers to fixed-point, because the integers are fixed-point already. The salient consideration is whether the rules preserve "integer-ness", i.e., whether combining two integer types produces an integer type. One example includes rules that do produce an integer type. One example includes rules that do not produce an integer type. Another example includes both, i.e., rules that produce an integer type in some cases, and a fixed-point type in other cases. The tables below illustrate an example of the latter.

| s8.0  | s16.0 |       |       |
| s16.0 | s16.0 | s16.0 |       |
| s32.0 | s32.0 | s32.0 | s32.0 |
|       | s8.0  | s16.0 | s32.0 |

Combining two signed integers produces a signed integer (as seen in the above table).

| u8.0  | u16.0 |       |       |
| u16.0 | u16.0 | u16.0 |       |
| u32.0 | u32.0 | u32.0 | u32.0 |
|       | u8.0  | u16.0 | u32.0 |

Combining two unsigned integers produces an unsigned integer(as seen in the table above).

| s8.0  | s16.-1 | s16.-1 | s32.-1 |
| s16.0 | s16.-1 | s16.-1 | s32.-1 |
| s32.0 | s32.-1 | s32.-1 | s32.-1 |
|       | u8.0   | u16.0  | u32.0  |

Combining signed integers with unsigned integers produces a fixed-point type with the radix point shifted one place to the right, to accommodate the extended range required by mixed signed-ness (as seen in the table above).

Program language 22 includes context-sensitive constants 44 that are distinct from ordinary constants. In an example, the constants 44 are distinguished from ordinary constants lexically using a suffix c. For example, 3.1415c and 17c are context sensitive constants, while 3.1415 is a double, 3.1415f is a single and 17 is an integer. The types of context-sensitive constants 44 are inherited from the context they appear in. The program language 22 includes top-down propagation rules 40 to determine the type the constant will inherit.

Program language 22 includes constant annotations 46 to explicitly specify the type of a literal constant. In an example, the program language 22 uses syntax of the form number: type. For example, 3.1415:s16.12 specifies that 3.1415 is to be encoded as an s16.12.

Program language 22 includes inherited-type assignment, which is distinct from ordinary assignment. In an example, inherited-type assignment is distinguished from ordinary assignment lexically using=as the ordinary assignment operator and :=as the inherited-type assignment operator. Program language 22 includes top-down propagation rules 40 that use the type of the left-hand side of the inherited-type assignment to determine the type of the value or computation on the right-hand side.

Program language 22 includes operator annotations 50 that directly specify the result type of the operation. One example uses syntax of the form a op:type b. For example, $a *{:}s16.12\, b$ specifies the result of the multiplication should have type s16.12.

As an example, we will describe five basic operators, i.e., addition (+), multiplication (*), division (/), unary minus (–), and assignment (=). Other examples include other operators as well (e.g., subtraction and modulus). Further, in the example we only consider a behavior of scalars, since the behavior of aggregates (e.g., vectors and matrices, complex) can easily be extrapolated.

In this example, the program language 22 supports the following scalar numeric types: integer (s8, s16, s32, u8, u16, u32), fixed-point (s8.r, s16.r, s32.r, u8.r, u16.r, u32.r), and floating-point (single, double). Integer types are distinct from fixed-point types. For example, s16 is different from s16.0.

In this example, the program language 22 includes context-sensitive constants 44 using the suffix c. For example, 3.1415c and 17c are context sensitive constants. The type of a context sensitive constant is determined by the operator applied to it, and by that operator's other operand. If the other operand is an integer, then the c suffix is ignored, and the constant's type is determined by the usual lexical rules. For example, 17c would be the integer 17; 3.1415c would be the double 3.1415. If the other operand is single then the constant's type is single. If the other operand is double then the constant's type is double. If the other operand is fixed-point then the constant's type depends on the operator. If the operator is * or / then the constant's type has the same number of bits as the other operand, and the signed-ness and radix point are chosen to encode the constant with maximum precision. If the operator is + then the constant's type is the same as the type of the other operand. An operator can have no more than one context-sensitive constant operand.

The program language 22 includes an inherited-type assignment operator of the form: c :=a op b, where op inherits its result type from c. Only one operator is permitted on the right hand side of the inherited-type assignment operator. If the right-hand side of an inherited-type assignment operator is a context-sensitive constant, the constant is given the type of the assignment's left-hand side. Otherwise, inherited-type assignment operators have no effect on the type of context-sensitive constants.

In other examples, if more operations are permitted on the right hand side of the equation, one must decide which of those operations inherit the type. For example, consider X=a*b+c*d. If only the addition (the top operation) inherit the type, we call this "shallow" inheritance. If the addition and both the multiplications (all the operators) inherit the type, we call it "deep" inheritance. One can set up other rules in between the extremes of "shallow" and "deep".

Except when context-sensitive constants or the inherited-type assignment operator are used, types are determined in a strictly bottom-up fashion.

The rules below describe binary operators. In general, the result type for unary minus applied to some type will be the same as for addition applied to two operands of the same type. That is,

−T will have the same type as

T+T

The following three tables specify the result of all operations for integers. Types are widened to at least 16 bits.

| s8  | s16 |     |     |
| --- | --- | --- | --- |
| s16 | s16 | s16 |     |
| s32 | s32 | s32 | s32 |
|     | s8  | s16 | s32 |

Combining two signed integers (as seen in the table above).

| u8  | U16 |     |     |
| --- | --- | --- | --- |
| u16 | U16 | u16 |     |
| u32 | U32 | u32 | u32 |
|     | U8  | u16 | u32 |

Unsigned integers behave similarly (as seen in the table above).

| s8  | s16 | U16 | U32 |
| --- | --- | --- | --- |
| s16 | s16 | U16 | U32 |
| s32 | U32 | s32 | U32 |
|     | U8  | u16 | u32 |

Combining signed integers with unsigned integers. This behavior follows that of ANSI C (as seen in the table above).

When integer types are combined with fixed-point types, the integer type is converted to a fixed-point type with radix point 0. For example, s16 would be converted to s16.0.

Then the fixed-point rules are applied as usual.

The following three tables specify the selection of the stored integer type for fixed-point operations a op b.

| s8  | s16 |     |     |
| --- | --- | --- | --- |
| s16 | s16 | s16 |     |
| s32 | s32 | s32 | s32 |
|     | s8  | s16 | s32 |

Combining two signed fixed-point types; same as for integers (as seen in the table above).

| u8  | U16 |     |     |
| --- | --- | --- | --- |
| u16 | U16 | u16 |     |
| u32 | U32 | u32 | u32 |
|     | U8  | u16 | u32 |

Combining two unsigned fixed-point types; also the same as for integers (as seen in the table above).

| s8  | s16 | s16 | s32 |
| --- | --- | --- | --- |
| s16 | s16 | s16 | s32 |
| s32 | s32 | s32 | s32 |
|     | U8  | u16 | u32 |

Combining signed fixed-point with unsigned fixed-point. Unlike integers, the type is always signed (as seen in the table above).

For addition of two signed or two unsigned fixed-point types the radix point is:

$r_{result} = \min(r_a, r_b)$

For addition of a signed fixed-point type to an unsigned fixed-point type the radix point is shifted right to accommodate the extended range required by mixed signed-ness:

$r_{result} = \min(r_a, r_b) - 1$

Multiplication of two fixed-point types (any signed-ness) uses a graduated radix point:

$r_{result} = (r_a + r_b)/2$

Division of two fixed-point types (any signed-ness) also uses a graduated radix point:

| | | |
|---|---|---|
| s.n | single | double |
| u.n | single | double |
| sn.r | single | double |
| un.r | single | double |
| single | single | double |
| double | double | double |
| | single | double |

Combining floating-point types with any other type (as seen in the table above).

As an example, the program language 22 can be used to develop a fixed-point application for an embedded system. The user 28 declares any variables required, using integer, fixed-point, or floating-point types as appropriate, and writes expressions for the necessary computations. The user 28 uses context-sensitive constants or annotated constants for fixed-point literal constants, inherited-type assignment or operator annotations when necessary to override the default result type of an operation, and freely mixes integer, fixed-point, and floating-point types as needed for efficient coding. The user 28 cross-compiles and links the program for the target embedded system, downloading and testing the program in the embedded system.

A number of embodiments of the invention have been described. Nevertheless, it will be understood that various modifications may be made without departing from the spirit and scope of the invention. Accordingly, other embodiments are within the scope of the following claims.

What is claimed is:

1. A programming language type system comprising:
   a processor for executing:
      fixed-point rules in which fixed-point types can be automatically converted to floating-point types, wherein the fixed-point rules preserve integer-ness for one or more integer operations;
      integer rules in which integer types are distinct from fixed-point types and integer types can be automatically converted to fixed-point types; and
   a storage device for storing a result of at least one of executing the fixed-point rules and the integer rules.

2. The system of claim 1 in which the fixed-point rules preserve integer-ness for all integer operations.

3. The system of claim 1 in which the fixed-point rules preserve integer-ness for multiplication and division integer operations via a graduated radix point rule.

4. The system of claim 1 in which the fixed-point rules for multiplication and division integer operations use a graduated radix point rule.

5. The system of claim 1 in which the fixed-point rules preserve integer-ness for one or more integer operations via operator annotations.

6. The system of claim 1 in which the fixed-point rules preserve integer-ness for one or more integer operations via an inherited type rule.

7. The system of claim 1 in which output types of any operation are specified in a top-down manner using a special assignment operator.

8. The system of claim 1 further comprising constant annotations to explicitly specify the types of literal constants.

9. The system of claim 1 in which the rules distinguish context-sensitive constants from ordinary constants lexically.

10. The system of claim 1 further comprising context-sensitive constants whose type is determined automatically from the constant's context by type propagation rules.

11. A programming language type system comprising:
   a processor for executing:
      fixed-point rules in which fixed-point types can be automatically converted to floating-point types, wherein the fixed-point rules preserve integer-ness for one or more integer operations;
      integer rules in which integer types are a subset of the fixed point types; and
   a storage device for storing a result of at least one of executing the fixed-point rules and the integer rules.

12. The system of claim 11 in which the fixed-point rules preserve integer-ness for all integer operations.

13. The system of claim 11 in which the fixed-point rules preserve integer-ness for multiplication and division integer operations via a graduated radix point rule.

14. The system of claim 11 in which the fixed-point rules for multiplication and division integer operations use a graduated radix point rule.

15. The system of claim 11 in which the fixed-point rules preserve integer-ness for one or more integer operations via operator annotations.

16. The system of claim 11 in which the fixed-point rules preserve integer-ness for one or more integer operations via an inherited type rule.

* * * * *